US012002958B2

(12) United States Patent
Kawaguchi et al.

(10) Patent No.: US 12,002,958 B2
(45) Date of Patent: Jun. 4, 2024

(54) COMPOSITE PARTICLES, NEGATIVE ELECTRODE ACTIVE MATERIAL, AND LITHIUM-ION SECONDARY BATTERY

(71) Applicant: SHOWA DENKO K. K., Tokyo (JP)

(72) Inventors: Naoto Kawaguchi, Tokyo (JP); Yuji Ito, Tokyo (JP); Masato Fujita, Tokyo (JP); Hirofumi Inoue, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 17/928,195

(22) PCT Filed: May 28, 2021

(86) PCT No.: PCT/JP2021/020503
§ 371 (c)(1),
(2) Date: Nov. 28, 2022

(87) PCT Pub. No.: WO2021/241754
PCT Pub. Date: Dec. 2, 2021

(65) Prior Publication Data
US 2023/0223537 A1  Jul. 13, 2023

(30) Foreign Application Priority Data

May 28, 2020 (JP) ................................ 2020-093159
Jan. 15, 2021 (JP) ................................ 2021-005095

(51) Int. Cl.
*H01M 4/587* (2010.01)
*C01B 32/318* (2017.01)
(Continued)

(52) U.S. Cl.
CPC .......... *H01M 4/587* (2013.01); *C01B 32/318* (2017.08); *C01B 32/342* (2017.08);
(Continued)

(58) Field of Classification Search
CPC ...... H01M 4/134; H01M 4/386; H01M 4/625; H01M 2004/027
See application file for complete search history.

(56) References Cited

U.S. PATENT DOCUMENTS 6,631,073 B1   10/2003  Sakata et al.
10,424,786 B1   9/2019  Mason et al.
(Continued)

FOREIGN PATENT DOCUMENTS

CN   102214823 A   10/2011
CN   108475779 A    8/2018
(Continued)

*Primary Examiner* — Khanh T Nguyen
(74) *Attorney, Agent, or Firm* — Sughrue Mion, PLLC

(57) ABSTRACT

The present invention relates to composite particles containing silicon and carbon, wherein a domain size region of vacancies of 2 nm or less is 44% by volume or more and 70% by volume or less when volume distribution information of domain sizes obtained by fitting a small-angle X-ray scattering spectrum of the composite particles with a spherical model in a carbon-vacancy binary system is accumulated in ascending order, and a true density calculated by dry density measurement by a constant volume expansion method using helium gas is 1.80 g/cm$^3$ or more and 2.20 g/cm$^3$ or less.

11 Claims, 2 Drawing Sheets

(51) Int. Cl.
  *C01B 32/342*      (2017.01)
  *C01B 32/372*      (2017.01)
  *H01M 4/36*        (2006.01)
  *H01M 4/38*        (2006.01)
  *H01M 4/62*        (2006.01)
  *H01M 4/02*        (2006.01)

(52) U.S. Cl.
  CPC ........... *C01B 32/372* (2017.08); *H01M 4/366* (2013.01); *H01M 4/386* (2013.01); *H01M 4/622* (2013.01); *H01M 4/625* (2013.01); *C01P 2002/02* (2013.01); *C01P 2002/72* (2013.01); *C01P 2002/74* (2013.01); *C01P 2002/82* (2013.01); *C01P 2004/61* (2013.01); *C01P 2004/80* (2013.01); *C01P 2006/10* (2013.01); *C01P 2006/12* (2013.01); *C01P 2006/40* (2013.01); *H01M 2004/021* (2013.01); *H01M 2004/027* (2013.01)

(56) References Cited

U.S. PATENT DOCUMENTS

| | | | |
|---|---|---|---|
| 2013/0004841 | A1 | 1/2013 | Thompkins et al. |
| 2013/0130115 | A1 | 5/2013 | Park et al. |
| 2014/0272592 | A1* | 9/2014 | Thompkins ........... H01M 4/364 |
| | | | 252/182.1 |
| 2017/0152340 | A1 | 6/2017 | Geramita et al. |
| 2019/0267622 | A1 | 8/2019 | Sakshaug et al. |
| 2019/0355971 | A1 | 11/2019 | Kim |
| 2020/0152973 | A1 | 5/2020 | Mason et al. |

FOREIGN PATENT DOCUMENTS

| | | | | |
|---|---|---|---|---|
| CN | 108565437 | A | 9/2018 | |
| GB | 2584615 | | 12/2020 | |
| JP | 11-339796 | A | 12/1999 | |
| JP | 2007-8790 | A | 1/2007 | |
| JP | 2007-39289 | A | 2/2007 | |
| JP | 3897709 | B2 | 3/2007 | |
| JP | 2009-49236 | A | 3/2009 | |
| JP | 2010-95390 | A | 4/2010 | |
| JP | 2010-525549 | A | 7/2010 | |
| JP | 2012-119079 | A | 6/2012 | |
| JP | 2014-511322 | A | 5/2014 | |
| JP | 2014-523468 | A | 9/2014 | |
| JP | 2015-50050 | A | 3/2015 | |
| JP | 2015-130287 | A | 7/2015 | |
| JP | 2016-132608 | A | 7/2016 | |
| JP | 2016-166116 | A | 9/2016 | |
| JP | 2017-88443 | A | 5/2017 | |
| JP | 2017-222547 | A | 12/2017 | |
| JP | 2018-32588 | A | 3/2018 | |
| JP | 6328107 | B2 | 5/2018 | |
| JP | 2018-534720 | A | 11/2018 | |
| JP | 2019-145212 | A | 8/2019 | |
| JP | 2019-179679 | A | 10/2019 | |
| KR | 10-2018-0113187 | A | 10/2018 | |
| KR | 10-2019-0122805 | A | 10/2019 | |
| WO | 2008/081883 | A1 | 7/2008 | |
| WO | WO 2013/106782 | A2 * | 7/2013 | ............. C01B 31/05 |
| WO | WO 2014/160385 | A2 * | 10/2014 | ............. C01B 32/05 |
| WO | 2015/019994 | A1 | 2/2015 | |
| WO | 2018/163778 | A1 | 9/2018 | |
| WO | 2019/031597 | A1 | 2/2019 | |
| WO | 2019/131861 | A1 | 7/2019 | |
| WO | 2019/131862 | A1 | 7/2019 | |
| WO | 2020/095067 | A1 | 5/2020 | |

\* cited by examiner

[Fig. 1]
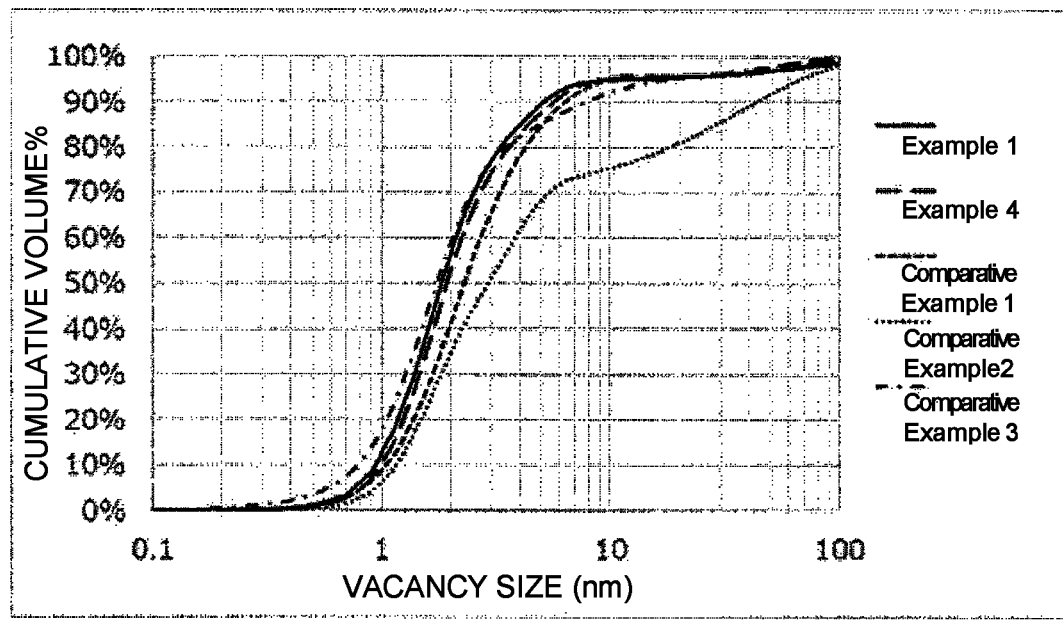
[Fig. 2]
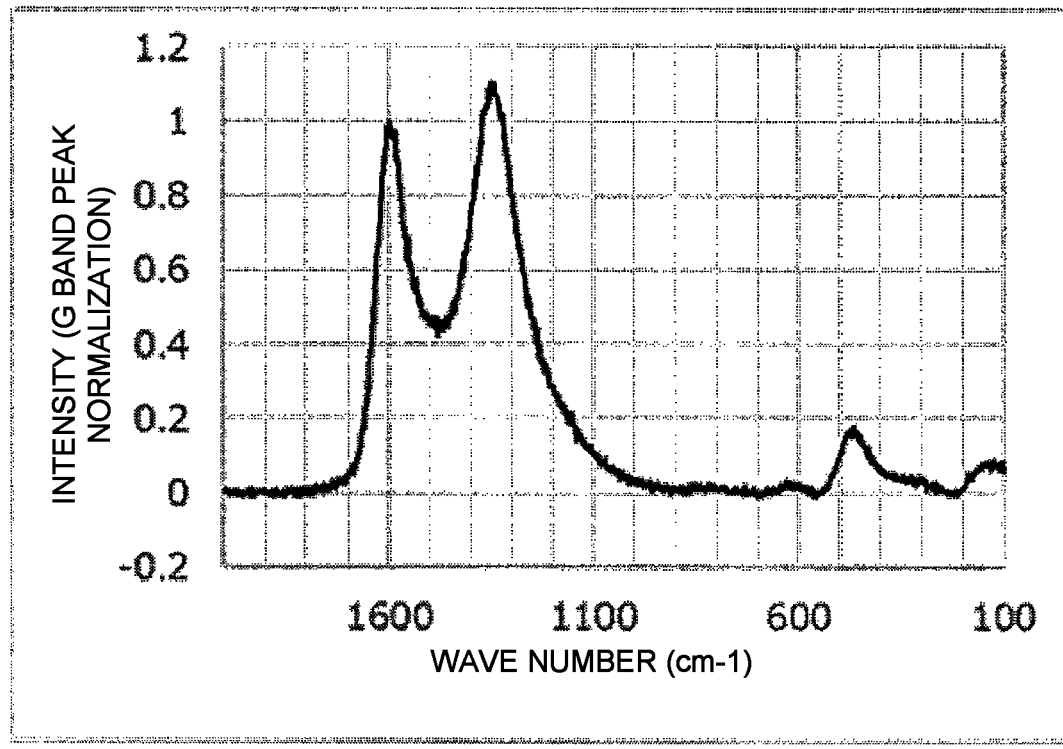

[Fig. 3]
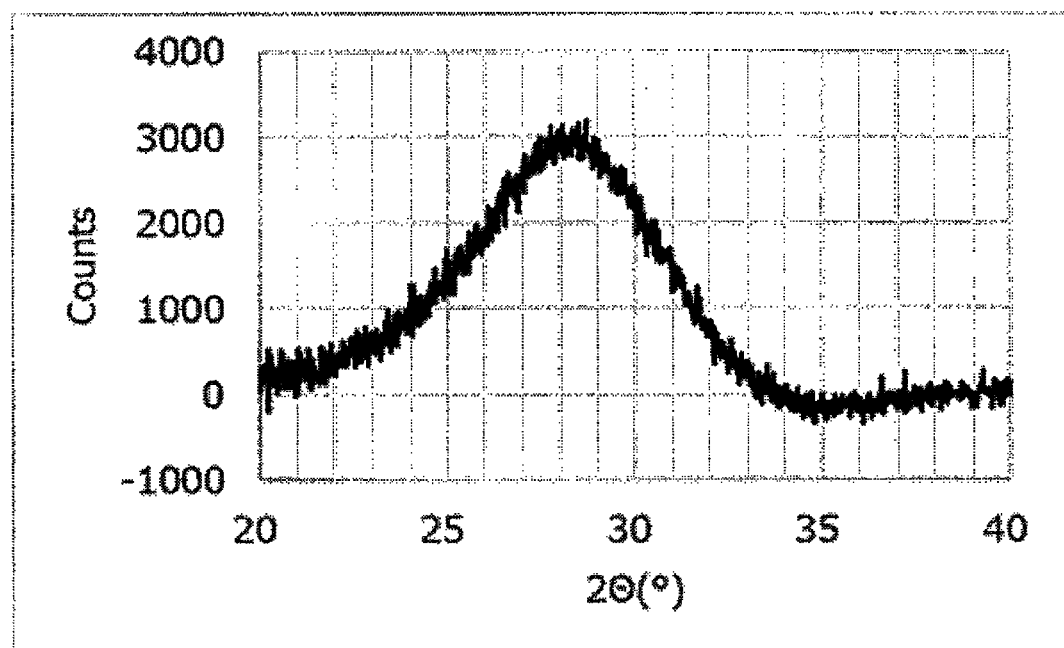

COMPOSITE PARTICLES, NEGATIVE ELECTRODE ACTIVE MATERIAL, AND LITHIUM-ION SECONDARY BATTERY

CROSS REFERENCE TO RELATED APPLICATIONS

This application is a National Stage of International Application No. PCT/JP2021/020503 filed May 28, 2021, claiming priority based on Japanese Patent Application No. 2020-093159 filed May 28, 2020 and 2021-005095 filed Jan. 15, 2021.

TECHNICAL FIELD

The present invention relates to composite particles, a negative electrode active material, a negative electrode mixture layer for a lithium-ion secondary battery comprising the composite particles and the negative electrode active material, and a lithium-ion secondary battery.

BACKGROUND ART

Secondary batteries used in IT devices such as smartphones and tablet PCs, vacuum cleaners, electric tools, electric bicycles, drones, and automobiles require negative electrode active materials with high capacity and high output. Silicon (theoretical specific capacity: 4200 mAh/g), which has a higher theoretical specific capacity than currently used graphite (theoretical specific capacity: 372 mAh/g), has attracted attention as a negative electrode active material.

However, silicon (Si) expands and contracts in volume up to about 3 to 4 times in association with electrochemical insertion and deinsertion of lithium. As a result, the silicon particles collapse or are separated from the electrode, and thus it is known that the lithium-ion secondary battery using silicon has extremely low cycle characteristics. For this reason, instead of simply replacing graphite with silicon, it is now being actively studied to use a structure in which the degree of expansion and contraction of the negative electrode material as a whole is reduced. Among them, many attempts have been made to form a composite with carbonaceous materials.

As such a negative electrode material for a lithium-ion secondary battery, U.S. Ser. No. 10/424,786B (Patent Literature 1) discloses a particulate material comprising a plurality of composite particles, wherein the composite particles comprise following features:
(a) a porous carbon framework comprising micropores and mesopores, wherein
  (i) the micropores and mesopores have a total pore volume as measured by gas adsorption of $P_1$ cm$^3$/g, wherein $P_1$ has a value of at least 0.6 and no more than 2;
  (ii) the volume fraction of micropores ($\varphi_a$) is in the range from 0.5 to 0.9, based on the total volume of micropores and mesopores;
  (iii) the volume fraction of pores having a pore diameter less than 10 nm ($\varphi_{10}$) is at least 0.75, based on the total volume of micropores and mesopores; and
  (iv) the porous carbon framework has a $D_{50}$ particle size of less than 20 μm; and
(b) a plurality of nanoscale elemental silicon domains located within the micropores and/or mesopores of the porous carbon framework;

wherein the weight ratio of silicon to the porous carbon framework in the composite particles is in the range from $[1 \times P_1$ to $1.9 \times P_1]:1$.

Further, JP2018-534720A (Patent Literature 2) discloses a composite comprising a porous carbon scaffold and silicon, wherein the composite comprises silicon at an amount of 15 to 85% by weight and a nitrogen-inaccessible volume at a range of 0.05 to 0.5 cm$^3$/g, and wherein the composite comprises a plurality of particles having a particle skeletal density at a range of 1.5 to 2.2 g/cm$^3$, as measured by helium pycnometry. Patent Literature 2 further discloses a porous carbon scaffold comprising 40 to 60% micropores, 40 to 60% mesopores, less than 1% macropores and a total pore volume between 0.1 and 0.5 cm$^3$/g as well as a composite having the content of silicon at a range of 25% to 65%.

JP2015-130287A (Patent Literature 3) discloses that small-angle X-ray scattering is used to evaluate the vacancy size distribution profile of a porous silicon-containing carbon-based composite material. WO2008/081883 (Patent Literature 4) discloses a carbon composite in which the volume occupied by pores having a pore size of 10 to 60 nm is 40 vol % or more.

CITATION LIST

Patent Literature

Patent Literature 1: U.S. Ser. No. 10/424,786B
Patent Literature 2: JP2018-534720A
Patent Literature 3: JP2015-130287A
Patent Literature 4: WO2008/081883

SUMMARY OF INVENTION

Technical Problem

Patent Literature 1 discloses composite particles of a porous carbon framework, and discloses a BET specific surface area by a nitrogen adsorption method with respect to pores inside the composite particles, but does not disclose the vacancy distribution inside the composite particles. The contents disclosed in Patent Literature 2 probably reflect the vacancies inside the composite, but there is no disclosure about the vacancy distribution inside. The vacancy distribution is also strongly affected by the shape of the composite particles and the susceptibility of the composite particles to destruction.

The porous silicon-containing carbon-based composite material of Patent Literature 3 needs to be heated to at least at the decomposition temperature of the organic compound in order to convert the organic compound into carbon, and needs to be treated at a high temperature of approximately 800° C. to 1200° C. in order to obtain carbon usable as a negative electrode active material, and at this time, silicon reacts with carbon to produce silicon carbide as a by-product, and thus the capacity decreases.

The carbon composite of Patent Literature 4 is inferior in durability because the vacancies have a large pore size.

Solution to Problem

The present invention comprises the following configurations.

The present invention comprises the following configurations.

[1] Composite Particles Containing:
silicon and carbon,
wherein a domain size region of 2 nm or less is 44% by volume or more and 70% by volume or less when volume distribution information of domain sizes of vacancies obtained by fitting a small-angle X-ray scattering spectrum of the composite particles with a spherical model in a carbon-vacancy binary system is accumulated in ascending order, and a true density calculated by dry density measurement by a constant volume expansion method using helium gas is 1.80 g/cm$^3$ or more and 2.20 g/cm$^3$ or less.

[2] The composite particles according to [1], wherein a content of silicon in the composite particles is 30% by mass or more and 80% by mass or less, and a content of oxygen is 0.1% by mass or more and 30% by mass or less when the content of silicon in the composite particles is designated as 100% by mass.

[3] The composite particles according to [1] or [2], wherein a peak attributed to silicon is present at 450 to 495 cm' in a Raman spectrum.

[4] The composite particles according to any one of [1] to [3], wherein R value (ID/IG) in the Raman spectrum is 0.30 or more and less than 1.30.

[5] The composite particles according to any one of [1] to [4], wherein (peak intensity of $SiC_{111}$ plane)/(peak intensity of $Si_{111}$ plane) is 0.01 or less, in an XRD pattern measured by powder XRD using a Cu-Kα radiation.

[6] The composite particles according to any one of [1] to [5], wherein the composite particles have an average particle size $D_{V50}$ of 1.0 μm or more and 30 μm or less, and have a BET specific surface area of 0.1 m$^2$/g or more and 100 m$^2$/g or less.

[7] The composite particles according to any one of [1] to [6], wherein inorganic particles and a polymer are present on at least a part of surfaces of the composite particles, a content of polymer is 0.1% by mass to 10.0% by mass, and the inorganic particles are one or more selected from graphite and carbon black.

[8] The composite particles according to any one of [1] to [7], wherein the carbon is amorphous carbon.

[9] A negative electrode active material containing the composite particles according to any one of [1] to [8].

[10] A negative electrode mixture layer containing the negative electrode active material according to [9].

[11] A lithium-ion secondary battery containing the negative electrode mixture layer according to [10].

Advantageous Effects of Invention

According to the present invention, it is possible to provide composite particles in which silicon is adhered in pores of a carbon material having predetermined pores. By using these composite particles, it is possible to provide a lithium-ion secondary battery having excellent capacity, initial coulombic efficiency, and cycle characteristics.

BRIEF DESCRIPTION OF DRAWINGS

FIG. 1 is a graph showing the results of small-angle X-ray scattering measurement of composite particles of Examples 1, 4, and Comparative Examples 1 to 3.

FIG. 2 is a graph showing the results of Raman spectroscopic measurement of the composite particles of Example 1.

FIG. 3 is a graph showing the results of powder XRD measurement of the composite particles of Example 1.

DESCRIPTION OF EMBODIMENTS

Hereinafter, embodiments of the present invention will be described.

[1] Carbon-Silicon Composite

In composite particles containing silicon and carbon according to an embodiment of the present invention, the domain size region of 2 nm or less is 44% by volume or more and 70% by volume or less when volume distribution information of domain sizes of vacancies obtained by fitting a small-angle X-ray scattering spectrum of the composite particles with a spherical model in a carbon-vacancy binary system is accumulated in ascending order, and the true density calculated by dry density measurement by a constant volume expansion method using helium gas is 1.80 g/cm$^3$ or more and 2.20 g/cm$^3$ or less.

When the composite particles have vacancies, the stress of expansion and contraction of the active material in association with charging and discharging can be relaxed, but when the vacancies are too large, the strength decreases, and thus the cycle characteristics decrease. Therefore, it is necessary to have a large number of vacancies of 2 nm or less corresponding to micropores. According to the analysis method using small-angle X-ray scattering described later, the observed domain reflects the vacancies in the composite particles.

When the domain size region of 2 nm or less is 44% by volume or more, there are sufficient micropores, volume changes due to the expansion and contraction of silicon during lithium insertion and deinsertion can be absorbed and the cycle characteristics can be improved. From the same viewpoint, the domain size region is more preferably 46% by volume or more, and still more preferably 48% by volume or more.

When the domain size region of 2 nm or less is 70% by volume or less, the discharge capacity can be increased because the silicon density in the composite particles is high. From the same viewpoint, the domain size region is more preferably 65% by volume or less, and still more preferably 57% by volume or less.

The small-angle X-ray scattering (SAXS) can quantify nanoscale density differences in a sample. This is done by analyzing the elastic scattering behavior of X-rays as they pass through the sample and recording their scattering at a small angle, usually 0.1 to 10°. The obtained spectrum (SAXS pattern) is subjected to simulation fitting of corresponding structural parameters, whereby the nanostructure analysis of the measurement sample can be performed. The fitting obtained from SAXS is the size information of the scatterer.

The SAXS pattern of the carbon-silicon composite according to the present invention includes scattering information of three types of domains: carbon, silicon, and vacancies. On the other hand, calculation methods for the three types of domains have not been established. Since the scattering ability of the scatterer is determined by the electron density, the difference in density between carbon or silicon and the void is larger than the difference in electron density between carbon and silicon. Therefore, the SAXS pattern of the carbon-silicon composite includes scattering information of carbon or silicon and voids. For this reason, the volume distribution information of the domain size of the carbon-silicon composite particles according to the present invention can be obtained by performing simulation fitting with a spherical model in a binary system of carbon and voids, which are the main components.

Also in the case where the composite contains a component other than carbon and silicon, the difference in density between the other component and vacancies is larger than the difference in density between the other component and carbon or silicon. Therefore, the SAXS pattern can be divided into scattering information of vacancies and the other component. Further, in a case where oxygen is contained in the composite, it is mainly contained as an oxide, so that a unique domain is not formed and scattering information cannot be obtained.

When the amount of silicon filled in the vacancies inside the composite particles is significantly less than the specified amount, the strength of the composite particles decreases, and thus the cycle characteristics decrease, or the initial efficiency decreases due to non-uniform silicon deposition. When the amount of silicon filled in the vacancies inside the composite particles is small, the true density of the composite particles decreases.

When the true density calculated by dry density measurement by a constant volume expansion method using helium gas is 1.80 g/cm$^3$ or more, the amount of silicon filled in the vacancies in the composite particles is sufficient, and the cycle characteristics can be improved. From the same viewpoint, the true density thereof is preferably 1.85 g/cm$^3$ or more, and more preferably 1.90 g/cm$^3$ or more.

When the true density calculated by dry density measurement by a constant volume expansion method using helium gas is 2.20 g/cm$^3$ or less, the carbon in the composite particles is amorphous carbon, and the carbon structure is isotropic, and thus the cycle characteristics can be improved. From the same viewpoint, the true density thereof is preferably 2.10 g/cm$^3$ or less, and more preferably 2.00 g/cm$^3$ or less.

The content of silicon in the composite particles according to an embodiment of the present invention is preferably 30% by mass or more and 80% or less. When the content is 30% by mass or more, the amount of silicon in the composite particles is sufficient, and the discharge capacity can be increased. From the same viewpoint, the content thereof is more preferably 35% by mass or more, and still more preferably 40% by mass or more. When the content of silicon is 80% by mass or less, the content of silicon is not excessive, so that the carbon serving as the carrier can absorb a volume change due to expansion and contraction thereof. From the same viewpoint, the content thereof is more preferably 70% by mass or less, and still more preferably 60% by mass or less.

The content of silicon in the composite particles can be obtained by X-ray fluorescence analysis (XRF) measurement described later.

When the content of silicon in the composite particles is 100% by mass, the content of oxygen is preferably 0.1% by mass or more and 30% by mass or less. Since pure Si has high activity, it is possible to suppress rapid deterioration of the composite particles by oxidizing the surface and reducing the activity, and thus the content is preferably 0.1% by mass or more. From the same viewpoint, the content thereof is more preferably 0.4% by mass or more, and still more preferably 0.9% by mass or more. When the content is 30% by mass or less, the oxidation of silicon is appropriately suppressed, so that the irreversible capacity when used as a negative electrode material can be reduced. From the same viewpoint, the content thereof is more preferably 10.0% by mass or less, still more preferably 5.0% by mass or less, and most preferably 3.0% by mass or less.

The content of oxygen when the content of silicon in the composite particles is designated as 100% by mass is obtained by dividing the content of oxygen obtained by an oxygen-nitrogen simultaneous analyzer described below by the content of silicon obtained by the XRF measurement.

In the Raman spectrum of the composite particles according to an embodiment of the present invention, a peak attributed to silicon is preferably present at 450 to 495 cm$^{-1}$. Normally, crystalline silicon has a peak in the vicinity of 520 cm$^{-1}$. Since amorphous silicon has a peak at a lower Raman shift, the presence of a peak at 450 to 495 cm$^{-1}$ indicates that the composite particles have amorphous silicon. When silicon is amorphous, expansion and contraction are relatively isotropic during charging and discharging, which can improve the cycle characteristics.

The composite particles according to an embodiment of the present invention preferably have an R value (ID/IG) of 0.30 or more and less than 1.30, R value, which is a ratio of the intensity ID of the D band to the intensity IG of the G band in the Raman spectrum. When R value is 0.30 or more, the negative electrode using this composite has a sufficiently low reaction resistance, which leads to an improvement in the coulombic efficiency of the battery. On the other hand, an R value of less than 1.30 means that there are few defects in the carbon layer. When R value is less than 1.30, the internal resistance of the battery is lowered and the rate characteristics are improved. From the same viewpoint, R value is more preferably 0.50 or more, still more preferably 0.70 or more, and most preferably 1.06 or more. Further, R value is more preferably 1.20 or less, and still more preferably 1.10 or less.

The G band in the Raman spectrum is the peak appearing in the vicinity of 1600 cm$^{-1}$ obtained when the carbon material is measured, and the D band is the peak appearing in the vicinity of 1350 cm$^{-1}$ similarly obtained when the carbon material is measured. The peak intensity is the height from the baseline to the peak apex after the baseline is corrected.

In the composite particles according to an embodiment of the present invention, in the XRD pattern measured by powder XRD using a Cu-Kα radiation, (peak intensity of SiC$_{111}$ plane)/(peak intensity of Si$_{111}$ plane) is preferably 0.01 or less. Accordingly, since SiC (silicon carbide) is not contained in the composite particles or the content of SiC is extremely low, the utilization rate of silicon as a battery active material is improved, and the initial discharge capacity can be increased. The (peak intensity of SiC$_{111}$ plane)/(peak intensity of Si$_{111}$ plane) is also referred to as ISiC$_{111}$/ISi$_{111}$. It is more preferable that the lower limit of ISiC$_{111}$/ISi$_{111}$ is 0, that is, the peak intensity of the SiC$_{111}$ plane is not observed. The peak intensity of SiC$_{111}$ plane means the height of peak appearing in the vicinity of 35 deg. at 2θ derived from SiC. The peak intensity of Si$_{111}$ plane means the height of peak appearing in the vicinity of 28 deg. at 2θ derived from Si.

The composite particles according to an embodiment of the present invention preferably has a 50% particle size in the volume-based cumulative particle size distribution, D$_{V50}$, of 1.0 μm or more and 30 μm or less. This is because when the D$_{V50}$ is 1.0 μm or more, side reactions with the electrolytic solution can be reduced. Furthermore, the powder is excellent in handleability, a slurry having a viscosity and a density suitable for coating is easily prepared, and the density of the electrode is easily increased. From this viewpoint, D$_{V50}$ is more preferably 2.0 μm or more, still more preferably 4.0 μm or more, and most preferably 7.0 μm or more. This is because when the D$_{V50}$ is 30.0 μm or less, side reactions with the electrolytic solution can be reduced. Furthermore, the powder is excellent in handleability, a slurry having a viscosity and a density suitable for coating is easily prepared, and the density of the electrode is easily increased. From this viewpoint, $D_{V50}$ is more preferably 20.0 µm or less, and still more preferably 15.0 µm or less.

The composite particles according to an embodiment of the present invention preferably has a 90% particle size in the volume-based cumulative particle size distribution, $D_{V90}$, of 50 µm or less. When $D_{V90}$ is 50 µm or less, the diffusion length of lithium in each particle is short, and thus the rate characteristics of a lithium-ion battery are excellent, and in addition, stripping or abnormal unevenness do not occur when the slurry is applied to a current collector. From this viewpoint, $D_{V90}$ is more preferably 40 µm or less, and still more preferably 30 µm or less.

These volume-based cumulative particle size distributions are measured, for example, by a laser diffraction particle size distribution meter.

In the composite particles according to an embodiment of the present invention, the BET specific surface area is preferably 0.1 m²/g or more and 100 m²/g or less. When the BET specific surface area is 0.1 m²/g or more, the slurry viscosity at the time of electrode production can be made suitable, whereby a good electrode can be produced. From the same viewpoint, the BET specific surface area is more preferably 0.4 m²/g or more, and still more preferably 0.7 m²/g or more. When the BET specific surface area is 100 m²/g or less, side reactions with the electrolytic solution can be reduced. From the same viewpoint, the BET specific surface area is more preferably 20 m²/g or less, and still more preferably 6.9 m²/g or less.

The BET specific surface area is usually measured by a dedicated measuring apparatus known in the art. Nitrogen is usually used as the adsorption gas, but carbon dioxide, and argon may also be used.

In the composite particle according to an embodiment of the present invention, inorganic particles and a polymer are preferably present on at least a part of surfaces of the composite particles. Here, the composite particles to which the inorganic particles and the polymer are adhered are referred to as core particles. When the inorganic particles and the polymer are present on the surfaces of the composite particles, the expansion and contraction of the composite particles in association with the insertion and deinsertion of lithium ions can be relaxed, and the oxidation of the composite particles over time can be suppressed.

The content of the inorganic particles is preferably 1.0% by mass to 15.0% by mass, more preferably 1.5% by mass to 13.0% by mass, still more preferably 1.5% by mass to 11.0% by mass of the entire composite particles from the viewpoint of improving the cycle characteristics.

The surface of the composite particles according to an embodiment of the present invention is preferably provided with protrusion structures derived from the inorganic particles. When the protrusion structure is present on the surface, adjacent negative electrode materials are easily brought into contact with each other even when the composite particles expand and contract. Further, the resistance value of the entire negative electrode material can be reduced. As a result, the decrease in capacity due to repeated charging and discharging can be suppressed, and the cycle characteristics are also excellent. This protruding structure can be seen by observing the composite particles with a scanning electron microscope (SEM).

Examples of the inorganic particles include metal oxides such as titanium oxide, niobium oxide, yttrium oxide, and aluminum oxide; lithium-containing oxides such as lithium titanate; and conductive particles containing carbon as a main component such as graphite, hard carbon, soft carbon, and carbon black. The types of the conductive particles are not particularly limited, but conductive particles containing carbon as a main component are preferable, at least one selected from the group consisting of granular graphite and carbon black is preferable, and granular graphite is preferable from the viewpoint of improving cycle characteristics. Examples of granular graphite include particles such as artificial graphite, natural graphite, and mesophase carbon (MC). Examples of carbon black include acetylene black, ketjen black, thermal black, and furnace black, and acetylene black is preferable from the viewpoint of conductivity. This is because the electrical conductivity of the composite particles can be increased.

Two or more of these can be selected and used. The shape of the granular graphite is not particularly limited and may be flat graphite or spherical graphite, but flat graphite is preferable from the viewpoint of improving the cycle characteristics. In the present invention, flat graphite means graphite having an aspect ratio (lengths of the minor axis and the major axis are not equal) of which is not 1. Examples of the flat graphite include graphite having a shape of, for example, a scale, a flake, and a lump, including porous graphite particles.

Examples of the aspect ratio of the flat graphite is not particularly limited, but the average value of the aspect ratio is preferably 0.3 or less, and more preferably 0.2 or less, from the viewpoint of easily ensuring conduction between the conductive particles and improving the cycle characteristics. The average value of the aspect ratio of the flat graphite is preferably 0.001 or more, more preferably 0.01 or more.

The aspect ratio is a value measured by observation by SEM. Specifically, the value is calculated as B/A when the length in the major axis direction is A and the length in the minor axis direction (the length in the thickness direction in the case of flat graphite) is B for each of 20 conductive particles arbitrarily selected in the SEM image. The average value of the aspect ratio is the arithmetic mean value of the aspect ratios of 20 conductive particles.

The particle size of the inorganic particles is preferably smaller than that of the core particles, and more preferably ½ or less. This is because the inorganic particles are likely to be present on the surface of the composite particles. The particle size can be measured by scanning electron microscope (SEM) observation of the composite particles.

The inorganic particles may be either primary particles (single particles) or secondary particles (granulated particles) formed from a plurality of primary particles.

The content of the polymer is preferably 0.1% by mass to 10.0% by mass in the entire composite particles. Within the above range, cycle durability can be improved while suppressing a decrease in conductivity. The content of the polymer in the entire composite particles according to an embodiment of the present invention is preferably 0.2% by mass to 7.0% by mass, more preferably 0.2% by mass to 5.0% by mass.

The content of the polymer in the composite particles can be confirmed by, for example, heating sufficiently dried polymer-coated composite particles to a temperature (for example, 300° C.) equal to or higher than a temperature at which the polymer decomposes and lower than a temperature at which silicon and carbon decompose, and measuring the mass of the composite material after the polymer decomposes.

Specifically, in a case where the mass of the polymer-coated composite particles before heating is A g and the mass of the composite particles after heating is B g, (A−B) is the content of the polymer. The content can be calculated as {A−B)/A}×100.

The above measurement can also be carried out by using thermogravimetry (TG). It is preferable because the amount of sample used is small and measurement can be performed with high accuracy.

The type of polymer is not particularly limited. Examples thereof include at least one selected from the group consisting of polysaccharides, cellulose derivatives, animal water-soluble polymers, lignin derivatives and water-soluble synthetic polymers, monosaccharides, disaccharides, oligosaccharides, amino acids, gallic acid, tannin, saccharin, saccharin salts and butynediol, sugar alcohols such as sorbitol, and polyhydric alcohols such as glycerin, 1,3-butanediol and dipropylene glycol.

Specific examples of the polysaccharide include starch derivatives such as starch acetate, starch phosphate, carboxymethyl starch, and hydroxyalkyl starches such as hydroxyethyl starch; dextrin; dextrin derivatives; cyclodextrin; alginic acid; alginic acid derivatives; sodium alginate; agarose; carrageenan, xyloglucan; glycogen; tamarind seed gum; dextrin; pullulan; and pectin. Examples of the cellulose derivative include carboxymethyl cellulose, methyl cellulose, hydroxyethyl cellulose, and hydroxypropyl cellulose. Examples of the animal water-soluble polymer include casein and gelatin. Examples of the water-soluble synthetic polymer include water-soluble acrylic polymers, water-soluble epoxy polymers, water-soluble polyesters, water-soluble polyamides, and water-soluble polyethers, and more specific examples thereof include polyvinyl alcohol, polyacrylic acid, polyacrylate, polyvinyl sulfonic acid, polyvinyl sulfonate, poly(4-vinylphenol), poly(4-vinylphenol) salt, polystyrene sulfonic acid, polystyrene sulfonate, polyaniline sulfonic acid, polyacrylamide, polyvinylpyrrolidone, and polyethylene glycol. The polymer may be used in the form of, for example, a metal salt and an alkylene glycol ester.

The polymer preferably contains one or more selected from the group consisting of polysaccharides, cellulose derivatives, gelatin, casein, and water-soluble polyethers as the first component, and one or more selected from the group consisting of monosaccharides, disaccharides, oligosaccharides, amino acids, gallic acid, tannin, saccharin, saccharin salts and butynediol, sugar alcohols such as sorbitol, and polyhydric alcohols such as glycerin, 1,3-butanediol and dipropylene glycol as the second component. In the present invention, the polysaccharide means a compound having a structure in which 10 or more monosaccharide molecules are bonded, and the oligosaccharide means a compound having a structure in which 3 to 10 monosaccharide molecules are bonded.

Specific examples of the water-soluble polyether include polyalkylene glycols such as polyethylene glycol. Specific examples of the monosaccharide include arabinose, glucose, mannose, and galactose. Specific examples of the disaccharide include sucrose, maltose, lactose, cellobiose, and trehalose. Specific examples of the oligosaccharide include raffinose, stachyose, and maltotriose. Specific examples of the amino acid include glycine, alanine, valine, leucine, isoleucine, serine, threonine, cysteine, cystine, methionine, aspartic acid, glutamic acid, lysine, arginine, phenylalanine, tyrosine, histidine, tryptophan, proline, oxyproline, and glycylglycine. Specific examples of the tannin include tea catechin and persimmon catechin.

The first component preferably contains at least one polysaccharide, more preferably at least one selected from the group consisting of tamarind seed gum, starch, dextrin, pullulan, and pectin. It is considered that the first component is present to cover at least a part of surfaces of the core particles, thereby reducing their specific surface area. As a result, the reaction between the composite particles and the electrolytic solution is suppressed, and the cycle performance can be improved.

The second component preferably contains at least one selected from the group consisting of disaccharides and monosaccharides, and more preferably contains at least one selected from the group consisting of sorbitol, maltose, lactose, trehalose, and glucose. It is considered that the second component is incorporated into the first component and suppresses the solubility of the deposited film formed from the first component in water or the electrolytic solution. By using the second component in combination, the surface of the core particles can be strongly coated, and the binding force of the inorganic particles can also be improved. Therefore, the cycle performance can be improved.

From the above viewpoint, in a case where the polymer contains the first component and the second component, the mass ratio thereof (first component:second component) is preferably 1:1 to 25:1, more preferably 3:1 to 20:1, and still more preferably 5:1 to 15:1.

[2] Carbon Material

The carbon material serving as a raw material of the carbon-silicon composite according to an embodiment of the present invention is not particularly limited, but graphite or amorphous carbon is preferable, and amorphous carbon is particularly preferable. Further, a porous carbon material is preferable. The porous carbon material is a carbon material having a total pore volume of 0.20 cc/g or more or a BET specific surface area of 200 $m^2$/g or more. Since the porous carbon material is considered to have a high adsorption rate of silane, fine silicon can be deposited in the pores when the composite particles are produced by, for example, CVD using silane gas. Examples of the shape thereof include a particulate shape and a fibrous shape, and a particulate shape is preferable. This is because the pores are isotropically formed in the form of particles, and thus the composite particles isotropically expand and contract at the time of insertion and deinsertion of lithium ions, resulting in excellent cycle characteristics. Since the composite particles expand and contract isotropically, it is preferable that the aspect ratio of the particles is small, and it is still more preferable that the particles have a spherical shape (circular cross-section). Examples of the porous carbon material include active carbon. The active carbon is usually amorphous carbon.

The carbon material used as a raw material for the composite particles according to an embodiment of the present invention preferably has a total pore volume of 0.30 cc/g or more. When the total pore volume is 0.30 cc/g or more, the amount of silicon inside the pores can be increased, so that the specific capacity of the composite particles can be increased. From this viewpoint, the total pore volume of the carbon material is more preferably 0.50 cc/g or more, and still more preferably 0.60 cc/g or more.

The carbon material used as a raw material for the composite particles according to an embodiment of the present invention preferably has a BET specific surface area of 200 $m^2$/g or more. When the BET specific surface area is 200 $m^2$/g or more, the amount of silicon inside the pores can be increased, so that the specific capacity of the composite particles can be increased. From this viewpoint, the BET specific surface area is more preferably 800 m²/g or more, and still more preferably 1500 m²/g or more.

The carbon material used as a raw material for the composite particles according to an embodiment of the present invention preferably has a 50% particle size in the volume-based cumulative particle size distribution, $D_{V50}$, of 1.0 μm or more and 30 μm or less. This is because when the $D_{V50}$ is 1.0 μm or more, side reactions with the electrolytic solution can be reduced when the composite particles are formed. Furthermore, the powder is excellent in handleability, a slurry having a viscosity and a density suitable for coating is easily prepared, and the density of the electrode is easily increased. From this viewpoint, $D_{V50}$ is more preferably 2.0 μm or more, still more preferably 4.0 μm or more, and most preferably 7.0 μm or more. This is because when the $D_{V50}$ is 30.0 μm or less, side reactions with the electrolytic solution can be reduced when the composite particles are formed. Furthermore, the powder is excellent in handleability, a slurry having a viscosity and a density suitable for coating is easily prepared, and the density of the electrode is easily increased. From this viewpoint, $D_{V50}$ is more preferably 20.0 μm or less, and still more preferably 15.0 μm or less. The carbon material may contain an element other than carbon as long as the performance of the composite particles is not impaired, but the content thereof is preferably 3% by mass or less, more preferably 2% by mass or less, from the viewpoint of increasing the capacity.

Even after the composite particles are obtained, silicon can be eluted by performing an appropriate treatment to obtain a carbon material as a raw material. Thus, the physical property values of the carbon material as a raw material can be investigated even from the state of the composite particles. For example, the $D_{V50}$, the pore volume, and the BET specific surface area can be examined.

[3] Method for Producing Composite Particles

The composite particles according to an embodiment of the present invention can be produced by, for example, the following steps (1) and (2), but the present invention is not limited thereto.

Step (1): a step of preparing carbon material,
wherein $V_1/V_0 > 0.8$ and $V_2/V_0 < 0.1$ are satisfied, when the total pore volume at the maximum value of the relative pressure $P/P_0$ is defined as $V_0$,
the cumulative pore volume at the relative pressure $P/P_0 = 0.1$ is defined as $V_1$, and
the cumulative pore volume at the relative pressure $P/P_0 = 10^{-7}$ is defined as $V_2$, in the nitrogen adsorption test, and the BET specific surface area is 800 m²/g or more.

At this time, it is preferable that $V_3/V_0 > 0.50$ is satisfied when the cumulative pore volume at the relative pressure $P/P_0 = 10\text{-}2$ is defined as $V_3$.

Step (2): step of allowing a Si-containing gas to act on the heated carbon material to deposit the Si-containing compound on a surface and in pores of the carbon material to obtain the composite particles containing the porous carbon and Si.

(Step (1))

Examples of the method for producing the carbon material include adjusting the conditions for thermally decomposing carbon material precursors such as resins and organic substances while examining changes in $V_0$, $V_1$, $V_2$, $V_3$, and BET specific surface area; or subjecting carbon material precursors such as carbon black to, for example, oxidation treatment and activation treatment and preparing so as to have the above-described characteristics. The carbon material precursor is preferably a phenolic resin or a copolymer resin of resorcinol and formaldehyde. Prior to carbonization, the resin may be cured by heat treatment at 150° C. to 300° C. for 1 to 6 hours. Further, after curing, the resin may be disintegrated to have a particle size of approximately 0.5 to 5.0 mm.

Preferably, the carbon material can be produced by carbonization by holding the resin at a temperature of 400° C. to 1100° C. for 1 to 20 hours in an inert gas atmosphere.

The obtained carbide is subjected to a nitrogen adsorption test, and in a case where the values of pore volume and BET specific surface area are not desirable, the activation treatment is performed as necessary. The carbide is heated to 800° C. to 1100° C. under an inert atmosphere, then switched to an activating gas such as $CO_2$ gas or steam gas, and held at that temperature for 1 to 20 hours. By this treatment, pores are further developed in the carbide.

In order to examine the pore volume and the BET specific surface area of the obtained activated material and to adjust these, a heat treatment may also be further performed in an inert gas such as Ar. The temperature is 1000° C. to 2000° C. and the temperature is maintained for 1 to 20 hours. By this treatment, the pores are reduced, and a carbon material having a desired $V_0$, $V_1$, $V_2$, $V_3$, and BET specific surface area can be obtained.

(Step (2))

The step (2) is a step in which a Si-containing gas, preferably a silane gas, is allowed to act on the heated carbon material to cause thermal decomposition of the Si-containing gas on a surface and in pores of the carbon material, so as to deposit the Si-containing compound on the surface and in the pores of the carbon material to obtain the composite particles.

For example, when the carbon material is placed in a chamber of a CVD apparatus and a silane gas is allowed to act on the carbon material in a heated state, silane enters the inside the pores of the carbon material and is further thermally decomposed, whereby Si can be deposited in the pores of the carbon material. As a method therefor, for example, an apparatus and a method disclosed in Patent Literature 1 can be used.

Silane decomposition also occurs on the surface of the carbon material, and Si is deposited. In general, the surface area of the pores of the carbon material is much larger than the external area, so that the amount of deposited Si in the pores of the carbon material is overwhelmingly large. It is preferable that Si is present in the pores of the carbon material because the durability against the stress in the composite particles caused by the expansion and contraction of Si in association with charging and discharging of the battery is improved. From this viewpoint, the carbon material is preferably a porous carbon material. When the amount of Si supported is increased or when the treatment is performed at a higher temperature, deposition on the surface of the carbon material may become remarkable.

Examples of the Si-containing gas used include disilane gas and trisilane gas in addition to silane ($SiH_4$) gas. Further, the Si-containing gas may contain other gases, and for example, gases such as nitrogen gas, argon, helium, and hydrogen gas may be mixed as the carrier gas. Various conditions of CVD, such as gas composition ratio, gas flow rate, temperature program, and fixed bed/fluidized bed selection, can be adjusted as appropriate while observing the nature of the product.

In a case where silane gas is used, the treatment is carried out at a treatment temperature of 340° C. to 450° C., more preferably 350° C. to 420° C., and still more preferably 370° C. to 400° C. In this temperature range, Si can be efficiently deposited in the pores of the carbon material, and the composite particles can be obtained.

Alternatively, after the Si-containing compound is deposited in the pores of the carbon material to obtain the composite particles the composite particles may be brought into contact with an inert gas atmosphere containing oxygen to oxidize the surface of the Si-containing compound. In particular, since pure Si has high activity, rapid deterioration of the composite particles can be suppressed by oxidizing the surface.

After the Si-containing compound deposition or oxidation, the surface of the composite particles may be separately coated. Specific examples thereof include carbon coating, inorganic oxide coating, and polymer coating. Examples of the carbon coating technique include chemical vapor deposition (CVD) and physical vapor deposition (PVD). Examples of the inorganic oxide coating technique include chemical vapor deposition (CVD), physical vapor deposition (PVD), atomic layer deposition (ALD), and wet method. The wet method includes a method of coating composite particles with a liquid obtained by dissolving or dispersing a precursor of an inorganic oxide in a solvent, and removing the solvent by, for example, heat treatment. As the type of polymer coating, a method of coating using a polymer solution, a method of coating using a polymer precursor containing a monomer and polymerizing by applying, for example, temperature or light, or a combination thereof may be used.

The surface coat of the composite particles can be analyzed by performing an analysis of the particle surface. Examples thereof include SEM-EDS, Auger electron spectroscopy, X-ray photoelectron spectroscopy (XPS), micro-infrared spectroscopy, and micro-Raman spectroscopy.

In order to prevent silicon in the composite particles from reacting with carbon to form silicon carbide as a by-product, it is preferable to treat at a temperature of less than 800° C. when the coating is applied.

The method of allowing the polymer to be present on at least a part of the surfaces of the composite particles is not particularly limited. For example, the core particles may be added in a liquid in which the polymer is dissolved or dispersed, followed by stirring as necessary, so that the polymer adheres to the core particles. Thereafter, the core particles to which the polymer is adhered are taken out of the liquid and dried as necessary, thereby obtaining the composite particles to which the polymer is adhered on the surface.

The temperature of the solution during stirring is not particularly limited, and can be selected from, for example, 5° C. to 95° C. In a case where the solution is heated, the concentration of the solution may change due to distillation of the solvent used in the solution. To avoid this, it is necessary to prepare the solution in a closed vessel or to reflux the solvent. As long as the polymer can be uniformly present on at least a part of surfaces of the core particles, the treatment may be performed while distilling off the solvent. The stirring atmosphere is not particularly limited as long as the performance of the composite particles is not impaired.

The temperature during drying is not particularly limited as long as the polymer is not decomposed and distilled off, and can be selected from, for example, 50° C. to 200° C. Drying in an inert atmosphere or under vacuum may be carried out.

The content of the polymer in the solution is not particularly limited and can be selected from, for example, 0.1% by mass to 20% by mass.

The solvent used for the solution can be any solvent capable of dissolving and dispersing the polymer and the precursor of the polymer. Examples thereof include those used as solvents such as water, alcohols such as acetonitrile, methanol, ethanol, and 2-propanol, ketones such as acetone and methyl ethyl ketone, and esters such as ethyl acetate and n-butyl acetate, and two or more thereof may be mixed and used. If necessary, an acid or a base may be added to adjust the pH of the solution. Known acids and bases can be selected and used.

After the Si-containing compound deposition or oxidation, inorganic particles may be allowed to be present on the surface of the composite particles. The technique for allowing the inorganic particles to be present is not limited, but the inorganic particles may be adhered to the core particles via a polymer by adding the core particles in a liquid in which the polymer has been dispersed or dissolved and the inorganic particles have been dispersed at the same time, and stirring the liquid as necessary. Thereafter, the core particles to which the inorganic particles and the polymer are adhered are taken out of the liquid and dried as necessary, thereby obtaining the composite particles to which the inorganic particles and the polymer are adhered on the surface. The composite particles can also be obtained by mixing the core particles, the inorganic particles, and the polymer.

At this time, a liquid in which each component is dissolved or dispersed may be prepared in advance and then mixed. Since the inorganic particles are preferably smaller than the core particles, it is preferable to use a liquid in which the inorganic particles are dispersed in advance. When the inorganic particles are dispersed, it is more preferable to prepare a dispersion by applying a shearing force using, for example, a ball mill or a bead mill, because the fine particles can be uniformly dispersed. When dispersing the inorganic particles, a dispersion aid may be added as appropriate. The dispersion aid may be freely selected from known substances and used.

In order to prevent silicon in the composite particles from reacting with carbon to form silicon carbide as a by-product, it is preferable to treat at a temperature of less than 800° C. during compositing.

The temperature of the solution during stirring is not particularly limited, and can be selected from, for example, 5° C. to 95° C. In a case where the solution is heated, the concentration of the solution may change due to distillation of the solvent used in the solution. To avoid this, it is necessary to prepare the solution in a closed vessel or to reflux the solvent. As long as the polymer can be uniformly present on at least a part of surfaces of the core particles, the treatment may be performed while distilling off the solvent. The stirring atmosphere is not particularly limited as long as the performance of the composite particles is not impaired.

The temperature during drying is not particularly limited as long as the inorganic particles is not decomposed and distilled off, or react with carbon to form silicon carbide as a by-product, and can be selected from, for example, 50° C. to 200° C. Drying in an inert atmosphere or under vacuum may be carried out.

The solid content of the dispersion is not particularly limited as long as uniform treatment can be performed, and can be selected from, for example, 20 to 80% by mass. The solid content represents a polymer, inorganic particles, and core particles.

The solvent used for the dispersion may be a solvent capable of dissolving and dispersing the polymer and the precursor of the polymer, and a solvent capable of dispersing the inorganic particles and the core particles. The solvent type can be freely selected as long as it does not interfere with the treatment for allowing the inorganic particles and the polymer to be present on at least a part of the surfaces of the core particles. Examples thereof include those used as solvents such as water, alcohols such as acetonitrile, methanol, ethanol, and 2-propanol, ketones such as acetone and methyl ethyl ketone, and esters such as ethyl acetate and n-butyl acetate, and two or more thereof may be mixed and used. If necessary, an acid or a base may be added to adjust the pH of the solution. Known acids and bases can be selected and used.

Examples of the effect of the coating include suppression of oxidation over time of the Si-containing compound inside the composite particles, improvement of the initial coulombic efficiency, and improvement of the cycle characteristics.

The suppression of the oxidation of the Si-containing compound over time means that when the composite particles are exposed to air or an oxygen-containing gas atmosphere, the oxidation of the Si-containing compound over time is suppressed. The presence of the coating layer on the surface of the composite particles can suppress air or an oxygen-containing gas from entering the inside of the composite particles.

The improvement of the initial coulombic efficiency means that the amount of lithium ions trapped in the composite particles is reduced at the time of initial lithium ion insertion into the composite particles inside the lithium-ion battery. When an electrolytic solution decomposition product film (solid electrolyte interface <SEI> film) is formed on the surface of the composite particles or a lithium ion entry port into the composite particles after lithium ions are inserted into the composite particles, the proportion of lithium ions that cannot be deinserted from the closed pores in the composite particles increases, and thus the initial coulombic efficiency decreases. Since the SEI film is present at the time of the second and subsequent lithium ion insertions, the ratio of lithium ions trapped in the composite particles is greatly reduced. As described above, since the problem is the trapping of lithium ions at the time of initial lithium ion insertion, the presence of a coating layer on the surfaces of the composite particles prevents the insertion of lithium ions into pores that are easily blocked by the SEI coating, thereby improving the initial coulombic efficiency.

The improvement of the cycle characteristics means that when the composite particles are applied to a lithium-ion battery and charging and discharging are repeated, a decrease in capacity is suppressed. It is considered that when charging and discharging are repeated in a lithium-ion battery, the Si-containing compound in the composite particles reacts with fluorine which is a component element of the electrolytic solution, and is eluted as a silicon fluoride compound. When the Si-containing compound elutes, the specific capacity of the composite particles decreases.

When the coating layer is present on the surface of the composite particles, the elution of the Si-containing compound is suppressed, and thus the capacity decrease of the composite particles is suppressed. Further, the coating reduces the resistance, improves the coulombic efficiency, and improves the cycle characteristics.

[4] Negative Electrode Active Material

The negative electrode active material according to an embodiment of the present invention contains the composite particles. Two or more kinds of the composite particles may be mixed and used. The negative electrode active material may further contain other components. Examples of other components include those generally used as negative electrode active material for a lithium-ion secondary battery. Examples thereof include graphite, hard carbon, soft carbon, lithium titanate ($Li_4Ti_5O_{12}$), alloy-based active materials such as silicon and tin, and composite materials thereof. These components are usually in the form of particles. The components other than the composite particles may be used alone or in combination of two or more kinds thereof. Among them, graphite particles and hard carbon are particularly preferably used.

When the negative electrode active material is formed by containing other components, the composite particles are adjusted to 1 to 50% by mass in the negative electrode active material. It is preferably adjusted to be 2 to 25% by mass. By mixing and using another carbon materials and a conductive assistant, it is possible to obtain a negative electrode active material having excellent characteristics of the other carbon material while maintaining the excellent characteristics of the composite particles. When a plurality of types of materials are used as the negative electrode active material, the materials may be mixed in advance and then used, or may be sequentially added when a slurry for forming a negative electrode mixture described below is prepared.

As an apparatus for mixing the composite particles and other materials, a commercially available mixer or stirrer can be used. Specific examples thereof include mixers such as a mortar, a ribbon mixer, a V-type mixer, a W-type mixer, a one blade mixer, and a Nauta mixer.

[5] Negative Electrode Mixture Layer

A negative electrode mixture layer according to an embodiment of the present invention contains the negative electrode active material described in the above [4].

The negative electrode mixture layer of the present invention can be used as a negative electrode mixture layer for a lithium-ion secondary battery. The negative electrode mixture layer generally contains a negative electrode active material, a binder, and a conductive assistant as an optional component.

A method for producing the negative electrode mixture layer may be, for example, a known method as described below. A negative electrode active material, a binder, a conductive assistant as an optional component, and a solvent are used to prepare a slurry for forming a negative electrode mixture. The slurry is applied to a current collector such as copper foil and dried. The solvent is further removed by vacuum drying. The obtained sheet may be referred to as a negative electrode sheet. The negative electrode sheet contains a negative electrode mixture layer and a current collector. The negative electrode sheet is then cut or punched out into a desired shape and size, and then pressed to improve the density of the electrode mixture layer (sometimes referred to as electrode density). Increasing the electrode density improves the energy density of the battery. The pressing method is not particularly limited as long as the electrode can be processed to have a desired electrode density, and examples thereof include uniaxial-pressing and roll-pressing. In Examples described later, the step of performing the pressing after the shape processing is illustrated, but the shape processing may be performed after the pressing. In the present invention, this material having a desired shape and an electrode density is referred to as a negative electrode. The negative electrode also includes a current collector with a current collector tab attached, as necessary.

Any binder generally used in the negative electrode mixture layer of a lithium-ion secondary battery can be freely selected and used as the binder. Examples thereof include polyethylene, polypropylene, ethylene-propylene terpolymer, butadiene rubber, styrene-butadiene rubber (SBR), butyl rubber, acrylic rubber, polyvinylidene fluoride (PVdF), polytetrafluoroethylene (PTFE), polyethylene oxide, polyepichlorohydrin, polyphosphazene, polyacrylonitrile, carboxymethyl cellulose (CMC) and salts thereof, polyacrylic acid, and polyacrylamide. The binder may be used alone or in combination of two or more kinds thereof. The amount of the binder is preferably 0.5 to 30 parts by mass based on 100 parts by mass of the negative electrode material.

The conductive assistant is not particularly limited as long as the conductive assistant plays a role in imparting electron conductivity and dimensional stability (buffering action on volume change in association with insertion and deinsertion of lithium) to the electrode. Examples thereof include carbon nanotubes, carbon nanofibers, vapor grown carbon fibers (for example, "VGCF®-H" manufactured by Showa Denko K.K.), conductive carbon black (for example, "DENKA BLACK®" manufactured by Denka Company Limited, "Super C65" manufactured by Imerys Graphite & Carbon, "Super C45" manufactured by Imerys Graphite & Carbon), and conductive graphite (for example, "KS6L" manufactured by Imerys Graphite & Carbon and "SFG6L" manufactured by Imerys Graphite & Carbon). A plurality of kinds of these may be used.

The conductive assistant preferably contains carbon nanotubes, carbon nanofibers, and vapor grown carbon fibers, and the fiber length of these conductive assistant is preferably ½ or more of the length of $D_{V50}$ of the composite particles. With this length, the conductive assistant bridges between the negative electrode active materials containing the composite particles, and the cycle characteristics can be improved. Furthermore, the number of bridges increases more with the single-wall type or the multi-wall type having a fiber diameter of 15 nm or less with the same amount of addition. Since these are more flexible, these are more preferable from the viewpoint of improving the electrode density.

The amount of the conductive assistant is preferably 1 to 30 parts by mass based on 100 parts by mass of the negative electrode material.

The solvent for preparing the slurry for electrode coating is not particularly limited, and examples thereof include N-methyl-2-pyrrolidone (NMP), dimethylformamide (DMF), isopropanol, tetrahydrofuran (THF), and water. In the case of a binder using water as a solvent, a thickening agent is preferably used in combination. The amount of the solvent can be adjusted so that the slurry achieves such viscosity that the slurry is easily applied onto a current collector.

[6] Lithium-Ion Secondary Battery

A lithium-ion secondary battery according to the present invention contains the negative electrode mixture layer. The lithium-ion secondary battery usually contains a negative electrode containing the negative electrode mixture layer and a current collector, a positive electrode containing a positive electrode mixture layer and a current collector, at least one of a nonaqueous electrolytic solution and a nonaqueous polymer electrolyte present therebetween, a separator, and a battery case accommodating these components. As long as the lithium-ion secondary battery includes the negative electrode mixture layer, other configurations including conventionally known configurations can be employed without particular limitation.

The positive electrode mixture layer usually contains a positive electrode material, a conductive assistant, and a binder. The positive electrode in the lithium-ion secondary battery may have a general configuration in a typical lithium-ion secondary battery.

The positive electrode material is not particularly limited as long as electrochemical lithium insertion and deinsertion can be reversibly performed and the oxidation-reduction potential of these reactions is sufficiently higher than the standard oxidation-reduction potential of the negative electrode reaction. For example, $LiCoO_2$, $LiNiO_2$, $LiMn_2O_4$, $LiCo_{1/3}Mn_{1/3}Ni_{1/3}O_2$, $LiCo_{0.6}Mn_{0.2}Ni_{0.2}O_2$, $LiCo_{0.8}Mn_{0.1}Ni_{0.1}O_2$, carbon-coated $LiFePO_4$, or a mixture thereof can be suitably used.

As the conductive assistant, the binder, and the solvent for preparing the slurry, those described in the section of the negative electrode can be used. Aluminum foil is preferably used as the current collector.

Those known as the electrolytic solution of lithium-ion secondary batteries can be used as the nonaqueous electrolytic solution and nonaqueous polymer electrolyte used in the lithium-ion batteries. For example, those in which lithium salts such as $LiClO_4$, $LiPF_6$, $LiAsF_6$, $LiBF_4$, $LiSO_3CF_3$, and $CH_3SO_3Li$ are dissolved in the following solvents or polymers are used. Examples of the solvent include a nonaqueous solvent such as ethylene carbonate, diethyl carbonate, dimethyl carbonate, ethyl methyl carbonate, propylene carbonate, butylene carbonate, acetonitrile, propionitrile, dimethoxyethane, tetrahydrofuran, and γ-butyrolactone; a gel polymer containing, for example, polyethylene oxide, polyacrylonitrile, polyvinylidene fluoride, and polymethyl methacrylate; and a polymer having an ethylene oxide bond.

Further, a small amount of the additive generally used in the electrolytic solution of a lithium-ion battery may be added to the nonaqueous electrolytic solution. Examples of the substance include vinylene carbonate (VC), biphenyl, propanesultone (PS), fluoroethylene carbonate (FEC), and ethylene sultone (ES). VC and FEC are preferred. The amount to be added is preferably 0.01 to 20% by mass based on 100% by mass of the nonaqueous electrolytic solution.

The separator can be freely selected from materials that can be used in general lithium-ion secondary batteries, including combinations thereof, and examples thereof include microporous films made of polyethylene or polypropylene. In addition, it is also possible to use separators obtained by mixing particles such as $SiO_2$ or $Al_2O_3$ as fillers into such separators, or separators obtained by adhering the particles to the surfaces of such separators.

The battery case is not particularly limited as long as it can accommodate the positive electrode, the negative electrode, the separator, and the electrolytic solution. In addition to those standardized in the industry such as commercially available battery packs, 18650 cylindrical cell, and coin-shaped cells, the battery case, including those packed with aluminum packaging material, for example, can be freely designed and used.

The electrodes may be stacked and packed for use. The single cells can be connected in series and used as batteries or modules.

The lithium-ion secondary battery according to the present invention can be used as a power source for electronic devices such as smartphones, tablet PCs, and mobile information terminals; a power source for electric motors such as electric tools, vacuum cleaners, electric bicycles, drones, and electric vehicles; and storage of electric power obtained by, for example, fuel cells, solar power generation, and wind power generation.

EXAMPLES

Hereinafter, the present invention will be specifically described with reference to Examples and Comparative Examples, but the present invention is not limited to these Examples. The material properties were measured and the battery characteristics were evaluated as follows.

[1] Evaluation of Material Properties

[1-1] $D_{V10}$, $D_{V50}$, $D_{V90}$ (Particle Size Distribution Measurement)

One ultra-small spatula of the sample and two drops of a 100-fold diluted solution of an undiluted solution (32% by mass) of a nonionic surfactant (SARAYA coconut detergent high power) were added to 15 mL of water, followed by ultrasonic dispersion for 3 minutes. This dispersion was charged into a laser diffraction-type particle size distribution analyzer (LMS-2000e) manufactured by Seishin Enterprise Co., Ltd., and a volume-based cumulative particle size distribution was measured to determine 10% particle size $D_{V10}$, 50% particle size $D_{V50}$, and 90% particle size $D_{V90}$.

[1-2] BET Specific Surface Area/Pore Volume (Nitrogen Adsorption Test)

Using NOVA4200e manufactured by Quantachrome Instruments as the measuring apparatus, a sample was placed in a sample cell (9 mm×135 mm) so that the total surface area of the sample was 2 to 60 m², dried at 300° C. under vacuum conditions for 1 hour, the sample weight was measured, and the measurement was performed. Nitrogen was used as the gas for measurement.

During the measurement, the set minimum relative pressure was 0.005 and the set maximum relative pressure was 0.995. The BET specific surface area of the porous carbon material was calculated by a BET multipoint method from adsorption isotherm data at a relative pressure of around 0.005 to less than 0.08. The BET specific surface area of the composite particles was calculated by a BET multipoint method from adsorption isotherm data at three points at relative pressures of around 0.1, around 0.2, and around 0.3. The total pore volume was determined by calculating the adsorption amount at a relative pressure of 0.99 by linear approximation from adsorption isotherm data at two points back and forth of a relative pressure of 0.99. At this time, the nitrogen liquid density was 0.808 (g/cc), the 1 mol volume of nitrogen in the standard state was 22.4133 L, and the nitrogen atomic weight was 14.0067.

[1-3] Volume Distribution of Domain Size of Vacancies (Small-Angle X-Ray Scattering)

Approximately 0.2 g of the sample was placed in a polyethylene bag with a zipper (UNIPAC A-4 manufactured by SEISANNIPPONSHA LTD.), sandwiched between sample holders, and subjected to measurement under the following conditions.

(Apparatus Conditions)
  XRD apparatus: SmartLab® manufactured by Rigaku Corporation
  X-ray target: Cu
  X-ray source: Cu-Kα radiation (wavelength: 1.541867 Å)
  Detector: scintillation counter SC-70
  Goniometer radius: 300 mm
  Optical system+selection slit: CBO+SA
  Incident optical slit: OPEN
  Attachment base: standard attachment base
  Attachment head: XY-20 mm attachment head
  Sample plate: transmission X-ray small-angle sample holder
  Reception optical unit: vacuum path
(Measurement Conditions)
  X-ray tube output: 45 kV, 200 mA
  Scan range: 0.06 to 9.98 deg (conditions determined by intensity of preliminary measurement)
  Scan step: 0.02 or 0.04 deg (conditions determined by intensity of preliminary measurement)
  Scan speed: 0.79 or 0.99 deg/min (conditions determined by intensity of preliminary measurement)

A polyethylene bag containing no sample was measured as a blank, the blank data was subtracted, and analysis was performed under the following conditions. As described above, in the analysis of the SAXS pattern, the analysis was performed by simulation fitting with a spherical model in a binary system of carbon and vacancies.

(Analysis Conditions)
  Software: Nano-solver manufactured by Rigaku Corporation
  Scatterer model: sphere
  Particles/vacancies: Pore
  Matrix: carbon
  Slit correction: high
  Analyzer crystal: none
  Distribution function: P distribution First, fitting was performed with one distribution. When the fitting was poor for one distribution, the fitting was increased, and R factor of 5% or less was set as a criterion for the fitting, and the distribution of the domain size in the particle was obtained from the distribution. From this result, the cumulative volume fraction with vacancies having a domain size of 2 nm was calculated. However, in a case where a data point with a domain size of 2 nm is not calculated from the analysis result, the cumulative volume fraction with a domain size of 2 nm was calculated by linear approximation from values with a domain size of back and forth of 2 nm.

[1-4] True Density

The sample was vacuum dried at 180° C. for 12 hours, and then the sample was filled in a glove box under a dry argon atmosphere so as to be 40% to 60% of a measurement cell, and the cell was tapped 100 times or more, and then the weight of the sample was measured. Thereafter, the sample was taken out to the atmosphere, and the dry density measurement by a constant volume expansion method using helium gas was performed by the following method, and the true density was calculated.

Apparatus: AccuPyc2 1340 Gas Pycnometer manufactured by Micromeritics Instrument Corporation
  Measurement cell: aluminum, depth 39.3 mm, inner diameter 18 mm
  Carrier gas: helium gas
  Gas pressure: 19.5 psig (134.4 kPag)
  Number of purges during measurement: 200 times
  Temperature: 25° C.±1° C.

[1-5] Content of Silicon

The content of Si of the sample was measured under the following conditions.

X-ray fluorescence apparatus: NEX CG manufactured by Rigaku Corporation
  Tube voltage: 50 kV
  Tube current: 1.00 mA
  Sample cup: Φ32, 12 mL, CH1530
  Sample weight: 2 to 3 g
  Sample height: 5 to 18 mm A sample cup was filled with a sample, the measurement was performed by the above method, and the content of silicon in the composite particles was calculated in units of % by mass using the fundamental parameter method (FP method).

[1-6] Oxygen Content

Into nickel capsules, 20 mg of the sample was weighed and an oxygen-nitrogen analyzer EMGA-920 (manufactured by HORIBA, Ltd.) was used to calculate the content of oxygen in the composite particles in the unit of % by mass. By dividing the content of oxygen in the composite particles by the content of silicon, the content of oxygen when the content of silicon in the composite particles was designated as 100% by mass was obtained in the unit of % by mass.

[1-7] Raman Si Peak, Raman R Value (ID/IG)

The measurement was performed under the following conditions.

Microscopic Raman spectroscopic measuring apparatus: LabRAM HR Evolution manufactured by HORIBA, Ltd.
  Excitation wavelength: 532 nm
  Exposure time: 10 seconds
  Integration: 2 times
  Diffraction gratings: 300/mm (600 nm)
  Measurement sample: the composite particles are placed on a glass preparation using a spatula so that the powder was uniformly spread. The range in which the sample was spread was wider than the measurement range described later.
  Measurement range: length 80 μm×width 100 μm, the measurement range was a portion where only composite particles were spread.
  Number of points: 100 points were measured with a vertical feed of 17.8 μm and a horizontal feed of 22.2 μm, and a spectrum obtained by averaging them was obtained and the following analysis was performed.

A Si peak at 450 to 495 $cm^{-1}$ in the Raman spectrum was observed. The ratio of the peak intensity (ID) in the vicinity of 1350 $cm^{-1}$ to the peak intensity (IG) in the vicinity of 1580 $cm^{-1}$ in the Raman spectrum was defined as R value (ID/IG). The height from the baseline to the peak top was taken as the intensity.

[1-8] (Peak Intensity of $SiC_{111}$ Plane)/(Peak Intensity of $Si_{111}$ Plane)

The sample was filled in a glass sample plate (window length and width: 18 mm×20 mm, depth: 0.2 mm), and measurement was performed under the following conditions.
  XRD apparatus: SmartLab® manufactured by Rigaku Corporation
  X-ray source: Cu-Kα radiation
  Kβ line removal method: Ni filter
  X-ray output: 45 kV, 200 mA
  Measuring range: 10.0 to 80.0°
  Scan speed: 10.0°/min The obtained XRD pattern was subjected to background removal and smoothing using analysis software (PDXL2, manufactured by Rigaku Corporation), and then subjected to peak fitting to determine the peak position and intensity. From the obtained XRD spectrum, the (peak intensity of $SiC_{111}$ plane)/(peak intensity of $Si_{111}$ plane) was determined. The $Si_{111}$ plane has a diffraction peak in the vicinity of 2θ=28°, and the $SiC_{111}$ plane has a diffraction peak in the vicinity of 2θ=35°.

[1-9] Measurement of Content of Polymer

The measurement was performed by the following method.
  Apparatus for TG-DTA: TG-DTA2000SE manufactured by NETZSCH Japan K.K.
  Sample weight: 10 to 20 mg
  Sample pan: alumina pan
  Reference: alumina pan
  Gas atmosphere: Ar
  Gas flow rate: 100 ml/min
  Temperature increasing rate: 10° C./min
  Measurement temperature range: Room temperature to 1000° C.

The polymer concentration was calculated by using the weight loss due to thermal decomposition at 200° C. to 350° C. as the polymer amount.

[2] Evaluation of Capacity and Initial Coulombic Efficiency

[2-1] Preparation of Negative Electrode Sheet

Styrene butadiene rubber (SBR) and carboxymethyl cellulose (CMC) were used as binders.

Specifically, an SBR aqueous dispersion in which SBR having a solid content of 40% by mass was dispersed and a 2% by mass CMC aqueous solution in which CMC powder was dissolved were obtained.

A mixture of carbon black (SUPER C45®, manufactured by Imerys Graphite & Carbon) and vapor grown carbon fibers (VGCF®-H, manufactured by Showa Denko K.K.) at a mass ratio of 3:2 was prepared as a mixed conductive assistant.

A negative electrode active material was obtained by mixing the composite particles and graphite particles so that the silicon concentration in the total amount of the negative electrode active material was 5.7 wt %. A slurry for forming a negative electrode mixture layer was obtained by mixing 90 parts by mass of a negative electrode active material, 5 parts by mass of a mixed conductive assistant, and CMC aqueous solution corresponding to 2.5 parts by mass of CMC solid and SBR aqueous dispersion corresponding to 2.5 parts by mass of SBR solid, adding an appropriate amount of water for viscosity adjustment, and kneading the mixture with a rotation/revolution mixer (manufactured by THINKY CORPORATION). The slurry concentration was 45 to 55% by mass.

The slurry for forming a negative electrode mixture layer was uniformly applied onto a copper foil having a thickness of 20 μm as a current collector foil using a doctor blade so as to have a gap of 150 μm, dried on a hot plate, and then vacuum-dried at 70° C. for 12 hours to form a negative electrode mixture layer on the current collector foil. This is referred to as a negative electrode sheet (sheet including negative electrode mixture layer and current collector foil).

The negative electrode sheet was punched out to a 16 mmφ and pressed by a uniaxial pressing machine to adjust the density of the negative electrode mixture layer to 1.4 g/cc, thereby obtaining a negative electrode.

The electrode density of the negative electrode (negative electrode density) was calculated as follows. The mass and the thickness of the negative electrode mixture layer were determined by measuring the mass and the thickness of the negative electrode obtained by the above-described method, and subtracting therefrom the mass and the thickness of the current collector foil punched out into 16 mmφ, which was separately measured, and the electrode density (negative electrode density) was calculated from the value.

[2-2] Preparation of Coin Cell (Lithium Counter Electrode Cell)

In an insulating gasket made of polypropylene (inside diameter: approximately 18 mm), a separator (polypropylene microporous film) impregnated with an electrolytic solution is sandwiched by the negative electrode described above and metal lithium foil (thicknesses: 1.7 mm) punched out to 17.5 mmφ, and laminated. At this time, the surface of the negative electrode mixture layer of the negative electrode is laminated so as to face the metal lithium foil with the separator sandwiched therebetween. This was placed in a 2320 coin-shaped cell and sealed with a caulking machine to obtain a test cell (lithium counter electrode cell).

The electrolytic solution in the lithium counter electrode cell used was a solution obtained by mixing 1 parts by mass of vinylene carbonate (VC) and 10 parts by mass of fluoroethylene carbonate (FEC) in 100 parts by mass of a solvent in which ethylene carbonate, ethyl methyl carbonate, and diethyl carbonate were mixed at a volume ratio of 3:5:2, and the electrolyte lithium hexafluorophosphate ($LiPF_6$) was further dissolved therein to a concentration of 1 mol/L.

[2-3] Initial Charge Specific Capacity, Initial Discharge Specific Capacity

The test was conducted using a lithium counter electrode cell. A constant current (constant current: CC) charging was performed from open circuit voltage (OCV) to 0.005 V at a current value corresponding to 0.1 C. At the time point when 0.005 V was reached, the charging was switched to constant voltage (constant voltage: CV) charging. The cutoff condition was set to the time point when the current value was decreased to the value corresponding to 0.005 C. The specific capacity at this time is taken as the initial charge specific capacity. Next, constant current discharging was performed at a current value corresponding to 0.1 C with an upper limit voltage of 1.5 V. The specific capacity at this time is taken as the initial discharge specific capacity.

The test was conducted in a constant temperature bath set at 25° C. At this time, the specific capacity is a value obtained by dividing the capacity by the mass of the negative electrode active material. In the present test, the "current value corresponding to 1 C" is a current that can discharge the capacity of the negative electrode estimated from the masses of Si and carbon (including graphite) in the negative electrode active material contained in the negative electrode and the theoretical specific capacity (4200 mAh/g and 372 mAh/g, respectively) in 1 hour.

[2-4] Initial Coulombic Efficiency

The initial coulombic efficiency (%) is defined as (initial discharge specific capacity)/(initial charge specific capacity)×100, which is expressed as a percentage of the value obtained by dividing the initial discharge specific capacity by the initial charge specific capacity.

[3] Cycle Retention Rate (Laminate Half Cell Charge/Discharge Test 50 Cycles)

[3-1] Preparation of Three Electrode Laminate Half Cell

The negative electrode sheet obtained in [2-1] was punched out into a working electrode by adjusting the negative electrode mixture layer density to 1.3 to 1.6 g/cc using a roll press so that the area of the mixture layer-coated portion was 4.0 $cm^2$ (2.0 cm×2.0 cm) and the area of the mixture layer-uncoated portion (=tab portion) was 0.5 $cm^2$ (1.0 cm×0.5 cm).

The Li roll was cut out to obtain a Li piece for a counter electrode having an area of 7.5 $cm^2$ (3.0 cm×2.5 cm) and a Li piece for a reference electrode having an area of 3.75 $cm^2$ (1.5 cm×2.5 cm). A Ni tab having a width of 5 mm was prepared for a counter electrode and a reference electrode, and a Ni mesh having a size of 5 mm×20 mm was fixed to overlap the 5 mm portion on the tip of the Ni tab. At this time, the 5 mm width of the Ni tab and the 5 mm width of the Ni mesh were aligned and fixed. A Ni tab for the working electrode was also fixed to the Cu foil tab portion of the negative electrode piece for the working electrode. The Ni mesh at the tip of the Ni tab for the counter electrode was attached to the corner of the Li piece so as to be vertical to the 3.0 cm side of the Li piece for the counter electrode. The Ni mesh at the tip of the Ni tab for the reference electrode was attached to the center of the 1.5 cm side of the Li piece so as to be vertical to the 1.5 cm side of the Li piece for the reference electrode.

A microporous polypropylene film was sandwiched between the working electrode and the counter electrode, and the reference electrode was brought into liquid contact nearby the working electrode with the microporous polypropylene film in-between so that short circuit does not occur. In this state, the resultant was sandwiched with two rectangular aluminum laminate packaging materials with the tips of all Ni tabs protruding outward, and the three sides were heat fused together. An electrolytic solution was injected thereinto from an opening. Then, the opening was sealed by heat fusion to prepare a three electrode laminate half cell for evaluation.

The electrolytic solution used was the same as that used in [2-2] described above.

[3-2] Determination of C Rate

The C rate of the cell using each negative electrode sheet was calculated from the initial discharge specific capacity calculated in [2-3] and the amount of the negative electrode active material on the negative electrode.

[3-3] Discharge/Charge Cycle Retention Rate Test Using Three Electrode Laminate Half Cell The three electrode laminate half cell obtained in [3-1] was set in a charge/discharge device, and aging was performed for 6 cycles under the following conditions. In the first cycle of the aging, a constant current (CC) charging was performed at 0.05 C from a rest potential to 0.005 V vs. Li/Li+. The discharging was performed at a constant current (CC) of 0.05 C to 1.5 V vs. Li/Li+. In the second to sixth cycle of the aging, after performing charging at a constant current (CC) of 0.2 C to 0.005 V vs. Li/Li+, and at the time point when 0.005 V vs. Li/Li+ was reached, the charging was switched to a constant voltage (CV) charging with a cut-off current value of 0.025 C. The discharging was performed at a constant current (CC) of 0.2 C to 1.5 V vs. Li/Li+.

After performing the aging, a discharge/charge cycle test was performed by the following method. The charging was performed at a constant current (CC) of 1 C to 0.005 V vs. Li/Li+, the charging was then switched to a constant voltage (CV) charging with a cut-off current value of 0.025 C. The discharging was performed at a constant current (CC) of 1 C to 1.5 V vs. Li/Li+. The charging and discharging operations were performed 20 cycles when the charging and discharging operations were defined as 1 cycle, and a low rate test was performed in the 21st cycle in which the charge/discharge rate was changed to 0.1 C. The discharge capacity in the 50th cycle after the start of the test at 1 C is defined as the Li deinsertion capacity in the 50th cycle.

A discharge (Li deinsertion) capacity retention rate in the 50th cycle defined by the following equation was calculated.

Discharge(Li deinsertion)capacity retention rate in 50th cycle (%)={(Li deinsertion capacity in 50th cycle after 1C test start)/(Li deinsertion capacity in first cycle after 1C test start)}×100

The details of the materials shown in Table 1 are as follows.

[Graphite Particles]

Artificial graphite having BET of 2.7 $m^2$/g, a $D_{V10}$ of 7 μm, a $D_{V50}$ of 14 μm, a $D_{V90}$ of 27 μm, a tap density of 0.98 g/cc, an initial charge (Li deinsertion) specific capacity of 360 mAh/g, and an initial coulombic efficiency of 92% were used.

[Inorganic Particle Dispersion]

As inorganic particles, flake graphites (KS-6, manufactured by TIMCAL Ltd.) and acetylene black (HS100, manufactured by Denka Company Limited.) having an average particle size $D_{V50}$ of 3 μm were prepared. Into 800 g of water, 156 g of flake graphite, 40 g of acetylene black, and 4 g of carboxymethyl cellulose were added, and the mixture was dispersed and mixed in a bead mill to obtain a conductive particle dispersion (solid content 20% by mass).

Example 1

Spherical phenolic resin 1 was calcined at 900° C. for 1 hour in a nitrogen atmosphere, carbonized, and then subjected to activation treatment under each condition shown in Table 1 to obtain a spherical active carbon 1 as a carbon material. The material properties of the carbon material are shown in Table 1.

The spherical active carbon 1 was subjected to silicon-CVD treatment using silane gas diluted with nitrogen gas under the conditions shown in Table 1 to deposited Si inside the carbon material, thereby obtaining composite particles. The material properties are shown in Table 2.

The obtained composite particles and graphite particles were uniformly mixed in an agate mortar and used as a negative electrode active material for battery evaluation. The composition of the negative electrode active material and the battery characteristics are shown in Table 2.

Example 2

Amorphous active carbon 1 was used as the carbon material. The material properties of the carbon material are shown in Table 1.

Amorphous active carbon 1 was subjected to silicon-CVD treatment using silane gas diluted with nitrogen gas under the conditions shown in Table 1 to deposited Si inside the carbon material, thereby obtaining composite particles. The material properties are shown in Table 2.

The obtained composite particles and graphite particles were uniformly mixed in an agate mortar and used as a negative electrode active material for battery evaluation. The composition of the negative electrode active material and the battery characteristics are shown in Table 2.

Example 3, Comparative Example 2

Amorphous active carbon 2 was used as the carbon material. The material properties of the carbon material are shown in Table 1.

Amorphous active carbon 2 was subjected to silicon-CVD treatment using silane gas diluted with nitrogen gas at different temperatures under the conditions shown in Table 1 to deposited Si inside the carbon material, thereby obtaining composite particles. The material properties are shown in Table 2.

The obtained composite particles and graphite particles were uniformly mixed in an agate mortar and used as a negative electrode active material for battery evaluation. The composition of the negative electrode active material and the battery characteristics are shown in Table 2.

Example 4, Comparative Example 1

Spherical phenolic resin 2 was calcined at 900° C. for 1 hour in a nitrogen atmosphere, carbonized, and then subjected to activation treatment under each condition shown in Table 1 to obtain spherical active carbons 2 and 3 as carbon materials. The material properties of the carbon material are shown in Table 1.

The spherical active carbons 2 and 3 were subjected to silicon-CVD treatment using silane gas diluted with nitrogen gas under the conditions shown in Table 1 to deposited Si inside the carbon material, thereby obtaining composite particles. The material properties are shown in Table 2.

The obtained composite particles and graphite particles were uniformly mixed in an agate mortar and used as a negative electrode active material for battery evaluation. The composition of the negative electrode active material and the battery characteristics are shown in Table 2.

Example 5

7 g of composite particles obtained by the same method as in Example 2, 1.98 g of water, 3.84 g of a 2.5% by mass tamarind seed gum aqueous solution as the first polymer aqueous solution, 0.43 g of a 2.5% by mass aqueous sorbitol solution as the second polymer aqueous solution, and 1.60 g of an inorganic particle dispersion were prepared. Water and the first polymer aqueous solution were charged into a polyethylene bottle with a lid having an internal volume of 105 ml, and mixed at 1000 rpm for 2 minutes with a rotation/revolution mixer (manufactured by THINKY CORPORATION). Composite particles were added and mixed at 1000 rpm for 2 minutes. Conductive particle dispersion was added and mixed at 1000 rpm for 2 minutes. The first polymer aqueous solution was added and mixed at 1000 rpm for 2 minutes. The obtained slurry was spread on a tray made of SUS and dried in a hot air dryer at 150° C. for 5 hours. The dried solid matter was recovered, and the aggregated particles were disintegrated in an agate mortar. When the obtained composite particles were observed by SEM, it was confirmed that flake graphite and acetylene black were present on the surface of the core particles, and a protruding structure was formed by the flake graphite. The content of polymer was 1.5% by mass. The material properties are shown in Table 2.

The obtained composite particles and artificial graphite particles were uniformly mixed in an agate mortar and used as a negative electrode active material for battery evaluation. The composition of the negative electrode active material and the battery characteristics are shown in Table 2.

Example 6

Treatment was carried out in the same manner as in Example 5, except that 0.29 g of water, 5.14 g of a 2.5% by mass aqueous pullulan solution as the first polymer aqueous solution, 0.57 g of a 2.5% by mass aqueous trehalose solution as the second polymer aqueous solution, and 2.14 g of a dispersion of inorganic particles were used. When the obtained composite particles were observed by SEM, it was confirmed that flake graphite and acetylene black were present on the surface of the core particles, and a protruding structure was formed by the flake graphite. The content of polymer was 1.9% by mass. The material properties are shown in Table 2.

The obtained composite particles and artificial graphite particles were uniformly mixed in an agate mortar and used as a negative electrode active material for battery evaluation. The composition of the negative electrode active material and the battery characteristics are shown in Table 2.

Example 7

Treatment was carried out in the same manner as in Example 5, except that 1.98 g of water, 3.84 g of a 2.5% by mass aqueous pectin solution as the first polymer aqueous solution, 0.43 g of a 2.5% by mass aqueous sorbitol solution as the second polymer aqueous solution, and 1.60 g of a dispersion of inorganic particles were used. When the obtained composite particles were observed by SEM, it was confirmed that flake graphite and acetylene black were present on the surface of the core particles, and a protruding structure was formed by the flake graphite. The content of polymer was 1.5% by mass. The material properties are shown in Table 2.

The obtained composite particles and artificial graphite particles were uniformly mixed in an agate mortar and used as a negative electrode active material for battery evaluation. The composition of the negative electrode active material and the battery characteristics are shown in Table 2.

Comparative Example 3

The activated carbon fiber in a 50% water-wet state was dried at 150° C. in a hot air dryer, crushed in a Wonder Blender (manufactured by OSAKA CHEMICAL Co., Ltd.), and coarse particles were removed with a sieve having an opening of 45 μm to obtain cylindrical active carbon as the carbon material. The material properties of the carbon material are shown in Table 1.

Cylindrical active carbon was subjected to silicon-CVD treatment using silane gas diluted with nitrogen gas under the conditions shown in Table 1 to deposited Si inside the carbon material, thereby obtaining composite particles. The material properties are shown in Table 2.

The obtained composite particles and artificial graphite particles were uniformly mixed in an agate mortar and used as a negative electrode active material for battery evaluation. The composition of the negative electrode active material and the battery characteristics are shown in Table 2.

The batteries using the composite particles of Examples 1 to 7 had excellent cycle characteristics, but the batteries using the composites of Comparative Examples 1 to 3 had inferior cycle characteristics. It is considered that in Comparative Examples 1 and 2, the cumulative values of the domain size of 2 nm or less were small, and the cycle characteristics were inferior as volume changes due to the expansion and contraction of silicon during lithium insertion and deinsertion could not be absorbed. It is considered that in Comparative Example 3, the true density was low, the number of vacancies having a size small enough not to be filled with silicon inside the carbon material was large, the strength was low, and thus the cycle characteristics were deteriorated, or the initial coulombic efficiency were deteriorated due to non-uniform silicon deposition.

TABLE 1

| | Raw material of carbon material | Carbonization treatment Temperature [° C.] | Activation treatment | | |
|---|---|---|---|---|---|
| | | | Treatment atmosphere | Temperature [° C.] | Time [h] |
| Example 1 | Spherical phenolic resin 1 | 900 | $CO_2$ | 900 | 6 |
| Example 2 | — | — | — | — | — |
| Example 3 | — | — | — | — | — |
| Example 4 | Spherical phenolic resin 2 | 900 | $CO_2$ | 950 | 4 |
| Example 5 | — | — | — | — | — |
| Example 6 | — | — | — | — | — |
| Example 7 | — | — | — | — | — |
| Comparative Example 1 | Spherical phenolic resin 2 | 900 | $CO_2$ | 1000 | 1 |
| Comparative Example 2 | — | — | — | — | — |
| Comparative Example 3 | Fibrous active carbon | — | — | — | — |

| | Carbon material characteristics | | | | | | | | | |
|---|---|---|---|---|---|---|---|---|---|---|
| | Carbon material | Dv50 [μm] | V0 [cc/g] | V1 | V2 | V3 | V1/V0 | V2/V0 | V3/V0 | BET specific surface area [m²/g] |
| Example 1 | Spherical active carbon 1 | 7.0 | 0.71 | 0.658 | 0.056 | 0.540 | 0.93 | 0.08 | 0.76 | 1700 |
| Example 2 | Amorphous active carbon 1 | 12.1 | 0.87 | — | — | — | — | — | — | 1750 |
| Example 3 | Amorphous active carbon 2 | 7.1 | 0.77 | — | — | — | — | — | — | 1700 |
| Example 4 | Spherical active carbon 2 | 9.5 | 0.81 | — | — | — | — | — | — | 1800 |
| Example 5 | Amorphous active carbon 1 | 12.1 | 0.87 | — | — | — | — | — | — | 1750 |

TABLE 1-continued

| | | | | | | | | | | |
|---|---|---|---|---|---|---|---|---|---|---|
| Example 6 | Amorphous active carbon 1 | 12.1 | 0.87 | — | — | — | — | — | — | 1750 |
| Example 7 | Amorphous active carbon 1 | 12.1 | 0.87 | — | — | — | — | — | — | 1750 |
| Comparative Example 1 | Spherical active carbon 3 | 9.5 | 1.03 | 0.874 | 0.001 | 0.578 | 0.85 | 0.00 | 0.56 | 2200 |
| Comparative Example 2 | Amorphous active carbon 2 | 7.1 | 0.77 | — | — | — | — | — | — | 1700 |
| Comparative Example 3 | Cylindrical active carbon | 17.5 | 0.75 | 0.676 | 0.041 | 0.539 | 0.91 | 0.06 | 0.72 | 1710 |

| | Charge amount of raw material [g] | Silane gas concentration [%] | Temperature [° C.] | Pressure [Torr] | Gas flow rate [sccm] | Time [hr] | Coating Inorganic particles | First polymer | Second polymer |
|---|---|---|---|---|---|---|---|---|---|
| | | | | CVD conditions | | | | | |
| Example 1 | 5 | 1.3 | 400 | 760 | 100 | 8 | None | None | None |
| Example 2 | 4 | 17.4 | 400 | 760 | 230 | 4 | None | None | None |
| Example 3 | 10 | 100 | 400 | 760 | 130 | 1.5 | None | None | None |
| Example 4 | 10 | 100 | 400 | 760 | 130 | 1.5 | None | None | None |
| Example 5 | 4 | 17.4 | 400 | 760 | 230 | 4 | Flake graphite, acetylene black | Tamarind seed gum | Sorbitol |
| Example 6 | 4 | 17.4 | 400 | 760 | 230 | 4 | Flake graphite, acetylene black | Pullulan | Trehalose |
| Example 7 | 4 | 17.4 | 400 | 760 | 230 | 4 | Flake graphite, acetylene black | Pectin | Sorbitol |
| Comparative Example 1 | 3.1 | 17.4 | 400 | 760 | 230 | 4 | None | None | None |
| Comparative Example 2 | 10 | 17.4 | 500 | 760 | 130 | 1.5 | None | None | None |
| Comparative Example 3 | 4 | 20 | 450 | 1520 | 230 | 3.5 | None | None | None |

TABLE 2

| | Composite particle characteristics | | | | | |
|---|---|---|---|---|---|---|
| | Cumulative value of domain size of 2 nm or less [vol %] | True density [g/cm3] | Silicon weight ratio [wt %] | Oxygen weight ratio [wt %] | Raman Si peak [cm$^{-1}$] | Raman R value (ID/IG) [—] | XRD: $(ISiC_{111})/(ISi_{111})$ [deg.] |
| Example 1 | 56 | 1.93 | 42 | 1.9 | 470 | 1.08 | 0 |
| Example 2 | 48 | 1.91 | 56 | 0.9 | 474 | 1.17 | 0 |
| Example 3 | 46 | 1.93 | 48 | 2.3 | 470 | 1.11 | 0 |
| Example 4 | 52 | 1.92 | 51 | 2.2 | 467 | 1.12 | 0 |
| Example 5 | 48 | 1.90 | 53 | 1.9 | 474 | 1.16 | 0 |
| Example 6 | 48 | 1.90 | 52 | 2.1 | 474 | 1.17 | 0 |
| Example 7 | 48 | 1.90 | 53 | 2.1 | 474 | 1.17 | 0 |
| Comparative Example 1 | 41 | 1.83 | 60 | 0.8 | 468 | 1.05 | 0 |

TABLE 2-continued

|  | | | | | | | |
|---|---|---|---|---|---|---|---|
| Comparative Example 2 | 34 | 1.94 | 50 | 3.5 | 469 | 1.14 | 0 |
| Comparative Example 3 | 58 | 1.71 | 51 | 2.4 | 472 | 1.01 | 0 |

| | Composite particle characteristics | | | |
|---|---|---|---|---|
| | Dv10 | Dv50 [um] | Dv90 | BET specific surface area [m²/g] |
| Example 1 | 4.8 | 9.6 | 17.5 | 0.9 |
| Example 2 | 6.5 | 13.9 | 25.9 | 0.8 |
| Example 3 | 1.6 | 7.2 | 13.7 | 5.4 |
| Example 4 | 4.5 | 9.4 | 17.5 | 0.8 |
| Example 5 | 7.4 | 14.5 | 29.3 | 1.9 |
| Example 6 | 8.2 | 17.3 | 31.2 | 2.6 |
| Example 7 | 7.7 | 15.1 | 28.9 | 2.1 |
| Comparative Example 1 | 2.9 | 6.5 | 12.5 | 1.1 |
| Comparative Example 2 | 1.4 | 7.1 | 13.4 | 8.4 |
| Comparative Example 3 | 10.5 | 17.7 | 30.9 | 0.6 |

| | Negative electrode active material ratio | | Battery characteristics | | | |
|---|---|---|---|---|---|---|
| | Composite concentration [wt %] | Graphite particle concentration [wt %] | Initial Li insertion specific capacity [mAh/g] | Initial Li deinsertion specific capacity [mAh/g] | Initial coulombic efficiency [%] | Cycle retention rate (after 50 cycles) [%] |
| Example 1 | 13.6 | 86.4 | 609 | 560 | 92.0 | 95 |
| Example 2 | 10.2 | 89.8 | 598 | 559 | 93.5 | 84 |
| Example 3 | 11.9 | 88.1 | 607 | 560 | 92.3 | 92 |
| Example 4 | 11.2 | 88.8 | 607 | 562 | 92.6 | 85 |
| Example 5 | 10.8 | 89.3 | 599 | 561 | 93.7 | 86 |
| Example 6 | 11.0 | 89.0 | 599 | 560 | 93.5 | 85 |
| Example 7 | 10.8 | 89.3 | 600 | 560 | 93.3 | 85 |
| Comparative Example 1 | 9.5 | 90.5 | 608 | 558 | 91.8 | 79 |
| Comparative Example 2 | 11.4 | 88.6 | 610 | 559 | 91.6 | 78 |
| Comparative Example 3 | 11.2 | 88.8 | 611 | 535 | 87.6 | 75 |

The invention claimed is:

1. Composite particles comprising:
   silicon and carbon,
   wherein a domain size region of 2 nm or less is 44% by volume or more and 70% by volume or less when volume distribution information of domain sizes of vacancies obtained by fitting a small-angle X-ray scattering spectrum of the composite particles with a spherical model in a carbon-vacancy binary system is accumulated in ascending order, and
   a true density calculated by dry density measurement by a constant volume expansion method using helium gas is 1.80 g/cm³ or more and 2.20 g/cm³ or less.

2. The composite particles according to claim 1, wherein a content of silicon in the composite particles is 30% by mass or more and 80% by mass or less, and a content of oxygen is 0.1% by mass or more and 30% by mass or less when the content of silicon in the composite particles is designated as 100% by mass.

3. The composite particles according to claim 1, wherein a peak attributed to silicon is present at 450 to 495 cm⁻¹ in a Raman spectrum.

4. The composite particles according to claim 1, wherein R value (ID/IG) in the Raman spectrum is 0.30 or more and less than 1.30.

5. The composite particles according to claim 1, wherein (peak intensity of $SiC_{111}$ plane)/(peak intensity of $Si_{111}$ plane) is 0.01 or less, in an XRD pattern measured by powder XRD using a Cu-Kα radiation.

6. The composite particles according to claim 1, wherein the composite particles have an average particle size $D_{V50}$ of 1.0 μm or more and 30 μm or less, and have a BET specific surface area of 0.1 m²/g or more and 100 m²/g or less.

7. The composite particles according to claim 1, wherein inorganic particles and a polymer are present on at least a part of surfaces of the composite particles, a content of polymer is 0.1% by mass to 10.0% by mass, and the inorganic particles are one or more selected from graphite and carbon black.

8. The composite particles according to claim 1, wherein the carbon is amorphous carbon.

9. A negative electrode active material comprising the composite particles according to claim 1.

10. A negative electrode mixture layer comprising the negative electrode active material according to claim 9.

11. A lithium-ion secondary battery comprising the negative electrode mixture layer according to claim 10.

* * * * *